June 15, 1948.  G. F. HODSON  2,443,188
BREAKING EGGS BY GRINDING THE SHELL AND
SEPARATELY CUTTING THE MEMBRANE
Filed May 8, 1944  10 Sheets-Sheet 3

June 15, 1948. G. F. HODSON 2,443,188
BREAKING EGGS BY GRINDING THE SHELL AND
SEPARATELY CUTTING THE MEMBRANE
Filed May 8, 1944 10 Sheets-Sheet 6

Inventor:
George F. Hodson,

June 15, 1948.

G. F. HODSON

2,443,188

BREAKING EGGS BY GRINDING THE SHELL AND
SEPARATELY CUTTING THE MEMBRANE

Filed May 8, 1944

June 15, 1948.  G. F. HODSON  2,443,188
BREAKING EGGS BY GRINDING THE SHELL AND
SEPARATELY CUTTING THE MEMBRANE
Filed May 8, 1944  10 Sheets-Sheet 9

Patented June 15, 1948

2,443,188

UNITED STATES PATENT OFFICE 2,443,188

BREAKING EGGS BY GRINDING THE SHELL AND SEPARATELY CUTTING THE MEMBRANE

George F. Hodson, Altus, Okla., assignor to Wilson & Company, Inc., a corporation of Delaware Application May 8, 1944, Serial No. 534,552

10 Claims. (Cl. 146—2)

This invention relates to an egg breaking process and more particularly to a method by which eggs may be automatically broken and their contents sorted.

In the past difficulty has been experienced in devising automatic methods for breaking eggs. This is largely due to the fact that each egg must be individually handled and its contents individually tested after breaking in order that all spoiled eggs may be disposed of without contaminating any part of the system.

The present method makes it possible to handle each egg by itself, each egg being individually advanced in predetermined axial alignment transverse to its direction of motion. The egg is then grasped in a pair of flexible cups, one at each end of the egg, wherein it is centered and firmly seated, a vacuum is established in each cup, the shell is scored about its circumference, preferably after being cleaned and sterilized in that region, the egg is separated slightly on the score line and the membrane cut, after which the shells are emptied of their contents individually by being separated while held under the vacuum in the cups. The contents of each egg are caught in an egg cup which is individusually tested, after which the whites and yolks may be separated in the usual manner, and the shells discharged.

In carrying out the process each element in the system is readily adapted for instantaneous cleaning in the event of breakage of an egg or in the event that one of the eggs should turn out to be spoiled. The apparatus for carrying out the process is or will be the subject matter of other applications.

The invention is illustrated in the drawings in which Fig. 1 and Fig. 2 together represent a side elevation partially in section of an apparatus suitable for carrying out the invention of the process, Fig. 2 adjoining Fig. 1 on its right-hand side; Fig. 21 is a detailed transverse elevation of the egg receiving cup 114; Fig. 22 is an enlarged plan view of the egg cup path; Fig. 25 is an enlarged sectional view through the vacuum cup mechanism.

As shown in the drawings, the eggs are introduced into the system by a dual screw feed 10 between which the eggs are advanced in the path 11 defined between the two screws. The screw thread 12 has a variable pitch so that the eggs are accelerated in motion as they advance. The eggs E are aligned with their long axes transverse to the direction of movement and only the ends of the egg are engaged by the screw threads. The egg is rolled along a pair of guide rails 14, preferably of hard rubber. The path is preferably inclined upwardly so that the egg is positioned positively by contact with the screw threads and at the same time has no tendency to develop momentum.

At the top of the screw feed the eggs are passed individually to saddles 15 which are maintained at predetermined distances on chains 16 and 17 which are suitably of the bicycle chain type. The saddle comprises two fingers 18 and 19 and the thumb 20 so shaped as to form the egg-shaped retaining zone 21 within which the egg E centrally locates itself, and within which it is held in axial alignment transverse to its direction of motion. The saddles are spaced closely enough together that there is not room for an egg to fall between them. The egg saddle chains 16 and 17 are mounted on sprocket wheels 22 and 23, respectively. It will be noted that chain 17 is mounted to the side of and above chain 16 and the entire cup is carried between the two chains. Furthermore, the diameter of the wheels 22 and 23 is large enough to permit the saddle to pass upright between the chains and the shafts 24 and 25, respectively. Because of its method of attachment, the egg saddle is always in vertical position, at all points upon the chain orbit. The wheels 22 and 23 are synchronized with the wheels 26 which drive the screws 10 so that a saddle 15 rises into egg receiving position at the end of the rails 14 at the appropriate time to receive an egg. The thumb 20 rises between the rails 14 and lifts the eggs therefrom.

Figure 1:
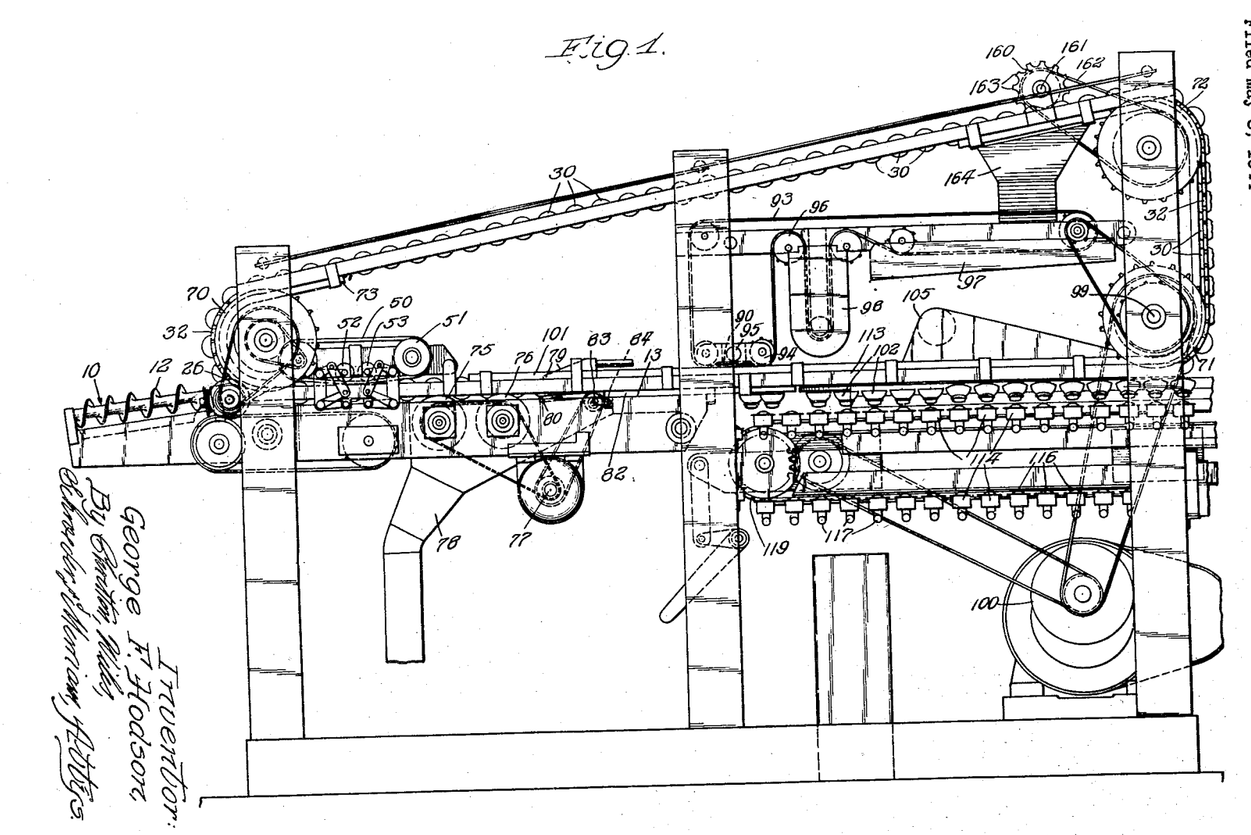
Figures 2, 21, 25:
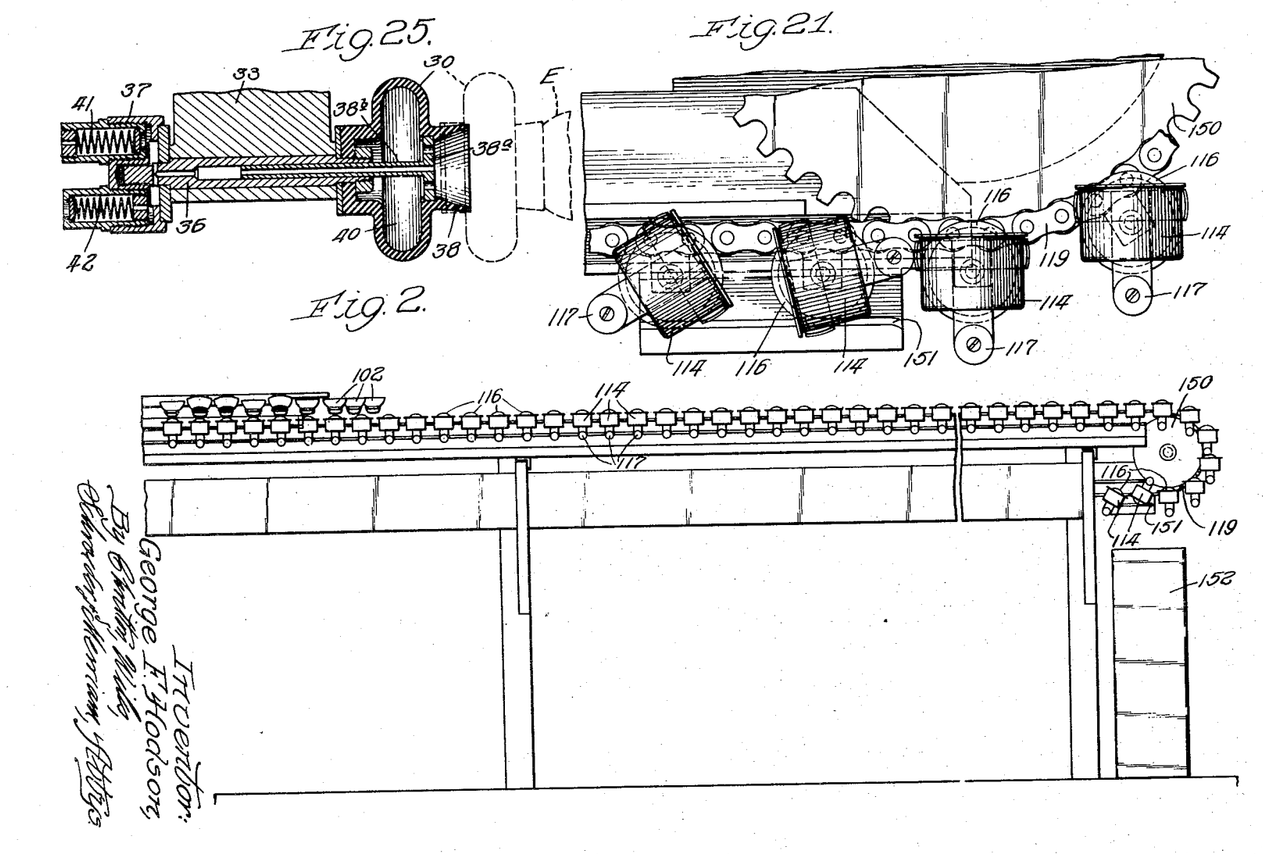
Figures 10, 17, 18, 19:
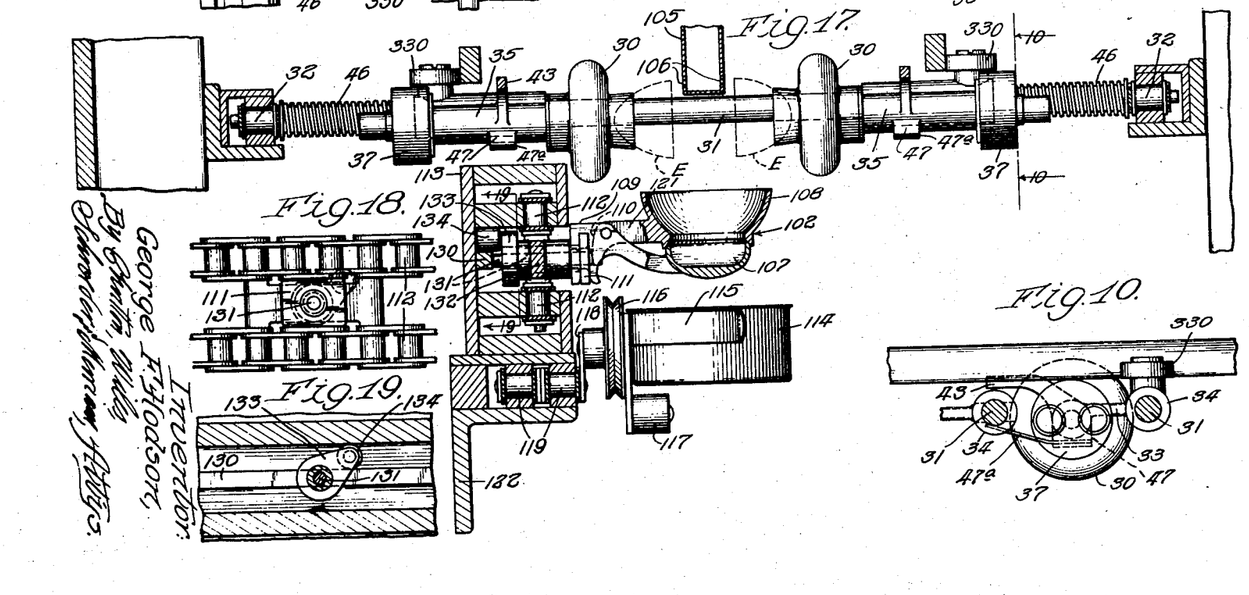
Fig. 10 is a sectional view taken along the line 10—10 in Fig. 17.
Fig. 17 is a transverse elevation partly in section taken along the line 17—17 in Fig. 5.
Fig. 18 is a detailed longitudinal elevation showing the chain 112 upon which the egg cups 102 are mounted.
Fig. 19 is a detailed end view of the cam follower arm 133 taken along line 19—19 of Fig. 17.

The eggs, properly oriented in their respective saddles, are carried forward and are grasped at each end by a flexible suction cup 30, best shown in Figs. 25 and 10. The cups are carried on platforms 33 pivotally mounted in pairs on shafts 31 mounted between a pair of chains 32, one at each end of the shaft. The platform is enlarged at one side to form a sleeve 34 which fits loosely about the shaft 31, and at the other to form a sleeve 35 which forms a bearing surface for the hollow shaft 36. The shaft 36 carries the suction cup 30 at its inner end and the roller 37 at its outer end.

The suction cup is made of some flexible material such as rubber. It comprises an egg engaging portion 38 having suitably beveled inner walls 39 which terminate in a feather edge. A perforated metal plate 38a carried by the perforated hollow guide rod 38b separates the egg engaging portion from the suction chamber 40. The rod 38b extends into the shaft 36. The suction chamber communicates through the hollow shaft with a check valve 41 carried in one arm of the roller 37, and with a vacuum relief valve 42 in the other arm of the roller 37. The valve 41 serves to vent any pressure which may accumulate in the suction chamber, and the valve 42 may be set to open upon any given vacuum, in order to limit the vacuum which may be created within the suction chamber.

The platform 33 also carries a stop 43 which bears upon the slide area 44 of the next adjacent platform and serves to limit the downward movement of the cup 30. The shaft 31 is provided with a suitable pin 45 for limiting the inward movement of the platform 33. A spring 46 is provided in connection with each platform and normally urges the platform toward the center of the shaft under a suitable pressure which is not sufficient to crush the eggs. Normally this pressure will be in the neighborhood of 4 lbs.

The platforms 33 also carry a depending shoulder portion 47 to which is secured the leaf spring 47a which normally urges the platform 33 in a downward direction. The platform 33 also carries the cam roller 330 which functions to position the platform laterally, as will be later described.

Figures 6, 11:
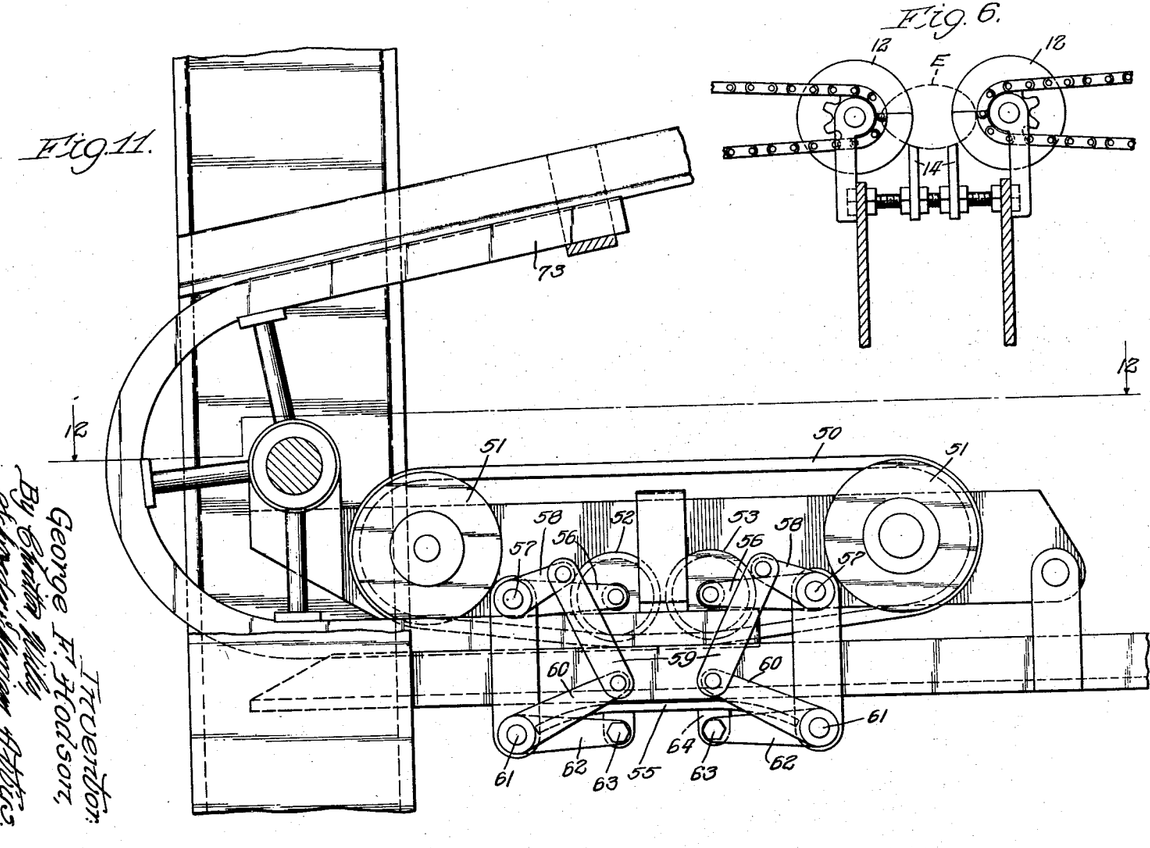
Fig. 6 is a transverse sectional elevation through the egg feeding means, taken along the line 6—6 in Fig. 9.
Fig. 11 is a side sectional elevation of the cup adjusting mechanism.
Figures 7, 8, 9:
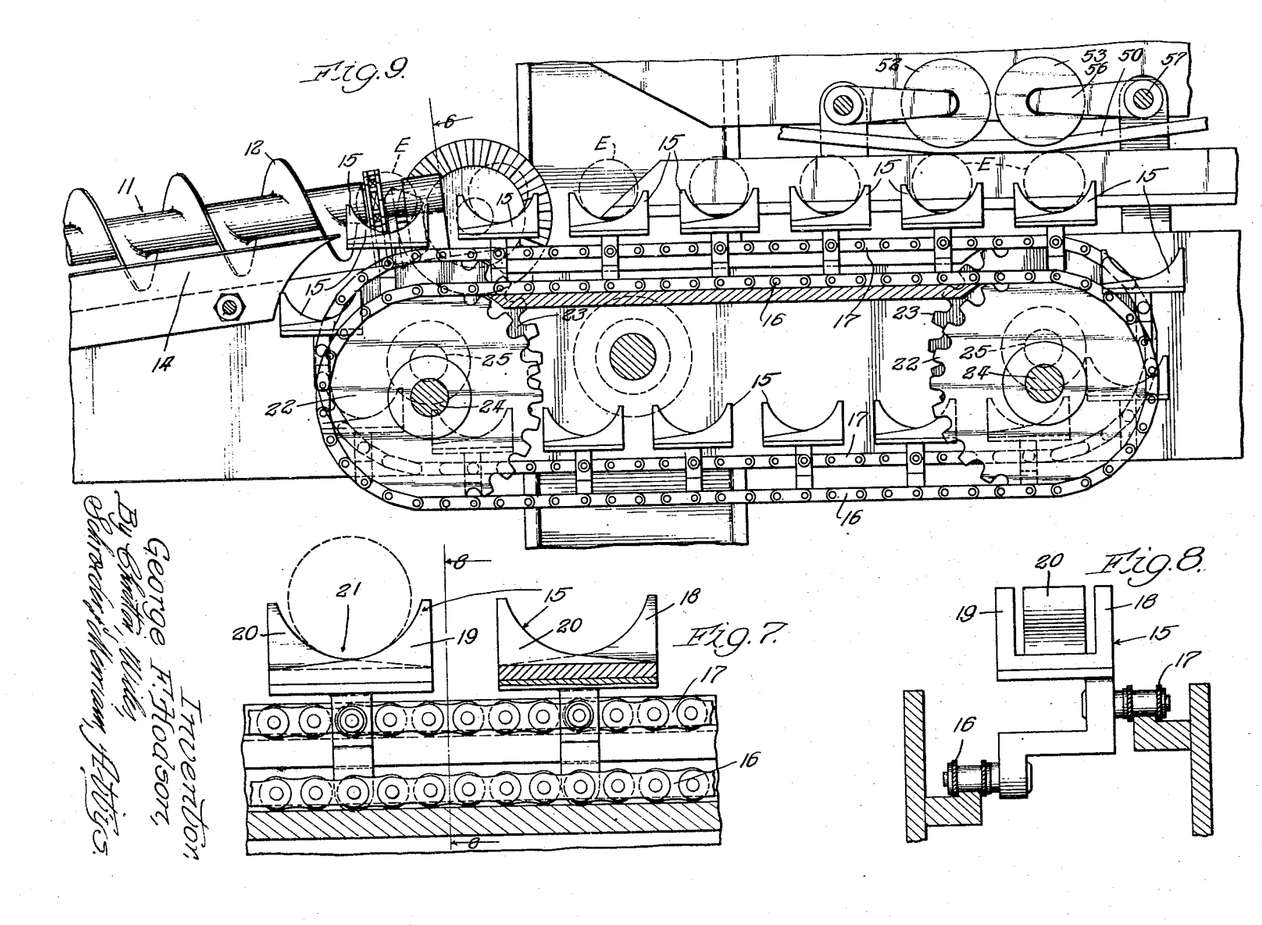
Fig. 7 is a side elevation of the egg saddles and the conveying chain.
Fig. 8 is a sectional view taken along the line 8—8 in Fig. 7.
Fig. 9 is a detailed side elevation partly in section of the egg carrying apparatus, shown on a smaller scale in Fig. 1.

As shown in Fig. 11, a V belt 50 of rubberized material is carried by wheels 51 above the saddle carrying mechanism. The belt 50 is provided with sufficient slack that under the conditions of operation it will contact the upper surfaces of any egg as it passes beneath the central portions of the belt. The belt travels at the same speed as the egg and is held in contact with it by the pulleys 52 and 53 which rest upon the upper side of the V belt. Each pulley is connected by a linkage assembly 54 to a platform 55. This linkage includes the pulley arm 56 secured to shaft 57 carrying the crank arm 58 to which the toggle arm 59 is pivotally secured. The arm 59 is likewise pivotally secured to the crank arm 60 (twice as long as the arm 58) on the shaft 61 also carrying the arm 62 pivotally secured at 63 to the stud 64 of the platform 55. As a result of this linkage, any upward movement of the pulleys 53 and 52 results in a corresponding upward movement of the platform 55 half as great.

The roller 37 is in contact with the upper surface of the platform 55 and, as a result, each vacuum cup 30 is individually adjusted vertically in accordance with variations in the position of the platform 55. Inasmuch as these variations correspond to half the variations in the diameter of the eggs, they correspond exactly with the changes in radius of the eggs and, therefore, the vacuum cups may be exactly positioned with respect to the long axis of each individual egg as it reaches gripping position, which is at the point intermediate the pulleys 52 and 53.

The ordinary egg may be assumed to have a diameter of 1½ inches and all of the adjustments of the machine may be made upon this basis. However, if other settings are desired, they may be made. The stop 43 on the platform 33 is so positioned of course that it does not strike the slide area 44 at a position which corresponds to any egg which may pass through the system. In other words, if the smallest egg has a diameter of 1¼ inches, the stop 43 may be positioned to strike only when clearance is less than one inch, giving a safety factor of ¼ inch.

As an example, if 1½ inches has been selected as the normal position, and an egg 1¾ inches in diameter is carried by a saddle into gripping position, the V belt will be elevated ¼ inch which will then raise the platform 55 ⅛ inch and accordingly center the cups accurately with respect to the ends of the egg.

Figure 12:
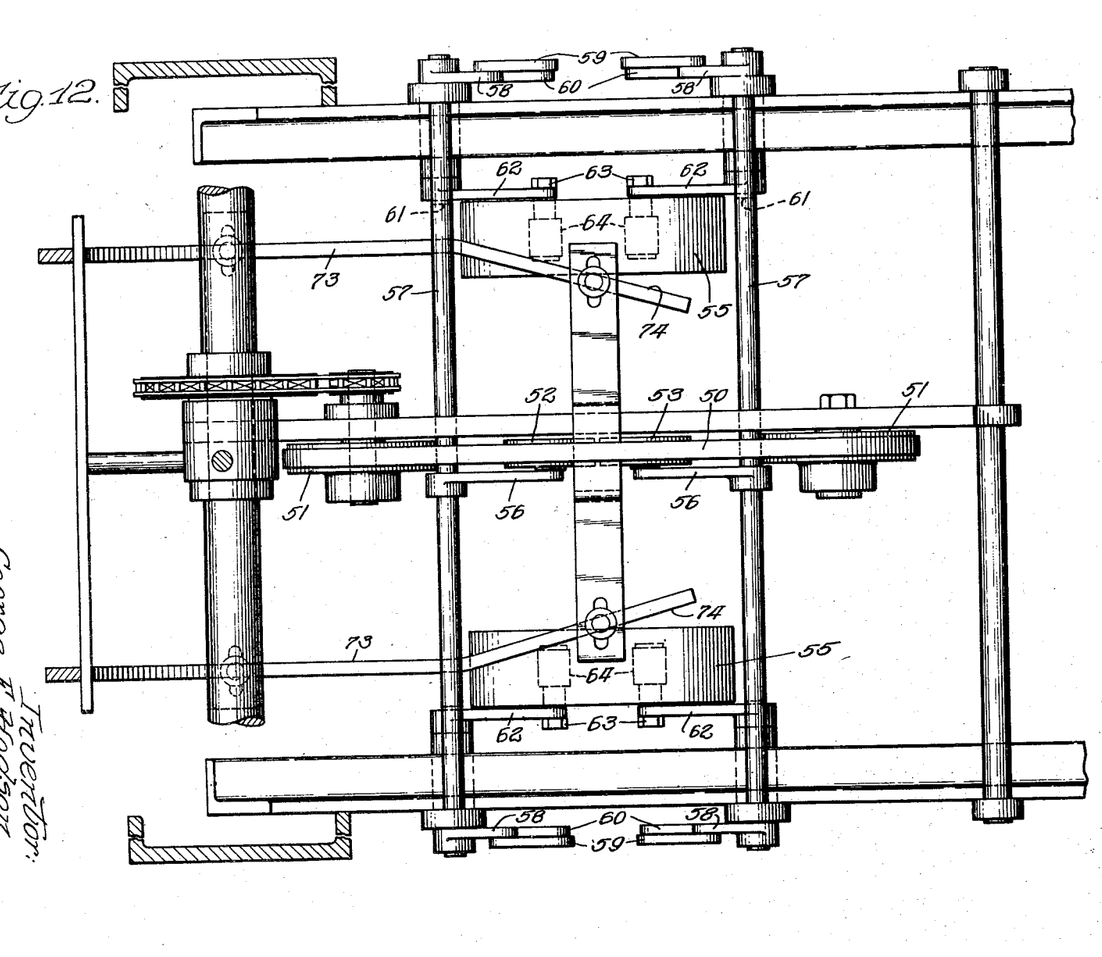
Fig. 12 is a plan view corresponding to Fig. 11 and taken along the line 12—12 of Fig. 11.

The chains 32 which carry the vacuum cups 30 are driven by wheels 71 and guided by wheels 70 and 72 in a triangular course. The cups are of course synchronized with the saddles. At the appropriate time during the course of travel the cam roller 330 engages the cam surfaces 73 and as a result is forced back against the springs 46. As the platforms 33 bearing the cups 30 move in synchronization with an egg in a saddle, they are gradually released by the cam surface 74 (shown in Fig. 12) and permitted to come into engagement with the egg under the pressure of the spring. At the same time the egg is held against rotation by the V belt 50 (as shown in Fig. 11) whereas the rollers 37 connected with the vacuum cups 30 are rotated by contact with the platform 33. In this way the position of the egg rotates with respect to the flexible grasping portion of the vacuum cup and is firmly seated therein by this motion.

The egg is now firmly held in a pair of vacuum cups and is from this point on carried by them, each individual saddle being carried downwardly by the chains 16 and 17 shortly after the vacuum cups have grasped the egg.

Figure 13:
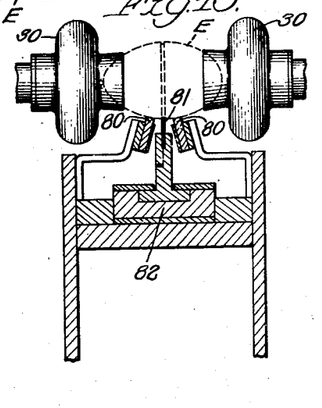
Fig. 13 is a transverse sectional elevation showing guides 80, stone 81, and carriage 82.

As the eggs are carried forward the equatorial portion thereof is cleaned by buffing wheels 75 and 76. These wheels employ any suitable light buffing material such as canvas and are rotated at considerable speed. The vacuum cups are at this point free to rotate so that the eggs do slowly revolve and are buffed throughout the equatorial circumference thereof. The buffing wheels may be driven by a motor 77. A dust collecting hopper 78 may be employed to collect the dirt and other debris brushed from the shells. After leaving the buffers, the equatorial portion of the eggs is brought into contact with a narrow gas flame 79 which acts to sterilize the shell of the eggs. Slightly before this, the eggs are engaged by the guides 80 which lift the platforms 33 into the proper position for scoring and at the same time cause the eggs to rotate. These guides are made of hard rubber and converge upwardly to provide a cradle. An elongated stone 81 is mounted midway between the guides and extends the length of approximately 10 inches, sufficiently long to insure complete encirclement of the eggs. The stone is mounted in a carriage 82 which is rapidly reciprocated as, for example, by an eccentric cam 83 driven by the motor 77 and connected to a lug 84 on the carriage 82 by an enclosing strap and link. The amount of movement of the carriage is preferably quite small as, for example, ⅛ inch, but the rate of reciprocation is preferably extremely high, as for example, 2,000 cycles per minute or more. The eggs are caused to rotate while in contact with the scoring stone because of the frictional engagement with the hard rubber guides 80.

Figure 5:
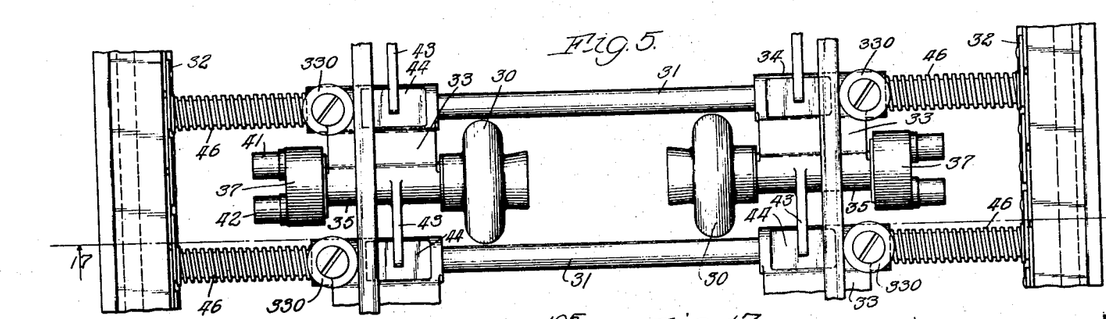
Fig. 5 is a detailed plan view partly in section of one of the egg gripping devices.

Upon complete scoring of the shells, which scoring is designed to cut substantially completely through the shell but not through the membrane of the eggs, the strength of the eggs decreases markedly and it is, therefore, preferred, in order to avoid breakage, to reduce the pressure upon the eggs. This is accomplished by guides 85 which retract the platforms 33 by contact with the cam rollers 330. This retraction is only slight, in order not to break the egg, and is accomplished through expansion of the flexible cup from the position 86, indicated by the dotted lines in Fig. 5, to a point intermediate that position and the one indicated in full lines in the same figure. This operation of course increases the vacuum within the cup and in order that this vacuum may not be too great, the vacuum relief valve 42 is set for a predetermined desirable vacuum. This limitation of vacuum is desirable to avoid premature breaking of the egg.

Figure 14:
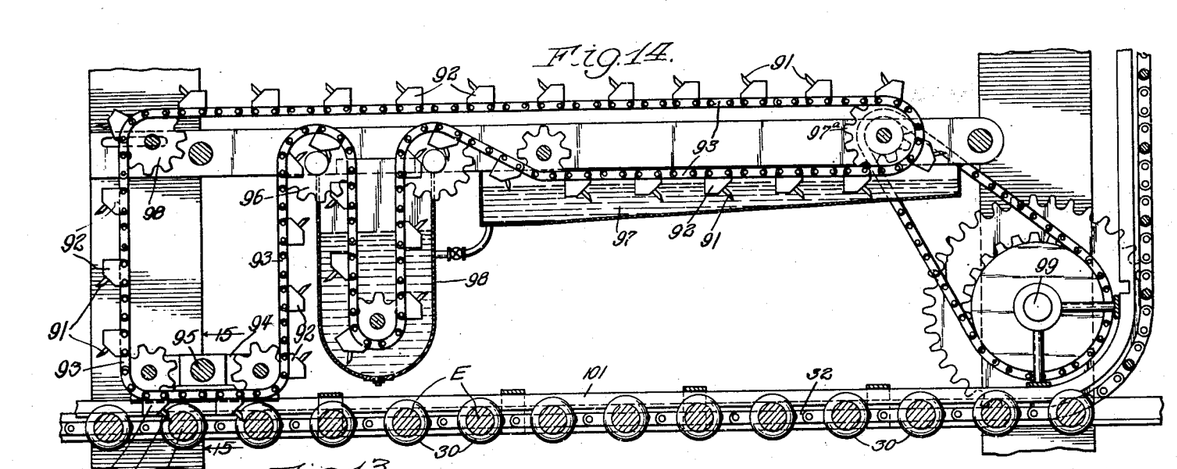
Fig. 14 is an enlarged side sectional elevation of the membrane cutting mechanism.
Figure 15:
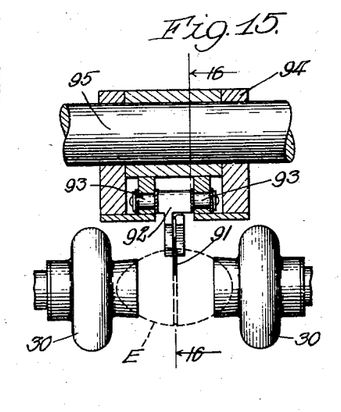
Fig. 15 is a transverse sectional elevation of the knife assembly taken along line 15—15 of Fig. 14.

After scoring and separating, the eggs are advanced to the cutting zone 90, an enlarged view of which is illustrated in Fig. 14.

The cutting mechanism consists of a very sharp pointed blade 91 directed at an angle of approximately 45° to the horizontal (and substantially perpendicular to the egg) and adapted to cut completely through the membrane. The point of blade is so positioned that it will completely sever the membrane on the smallest egg, but will not cut the yolk on the largest egg. Puncture of the yolk is avoided by having the knife above the egg, the yolk tending to seek the lower portions of the egg because of its greater specific gravity. The blade is carried in a clamping device 92 which in turn is carried by a link chain 93. The chain is guided within the housing 94 suspended from the shaft 95. The chain 93, after being guided through the housing 94, is carried upwardly over the wheel 96 through the bath 98 and then through the bath of chlorinated water 97, and then over wheels 97a and 98, and returns to the cutting zone. The chain may be driven from the pulley shaft 99 which in turn is driven by a motor 100.

Figure 16:
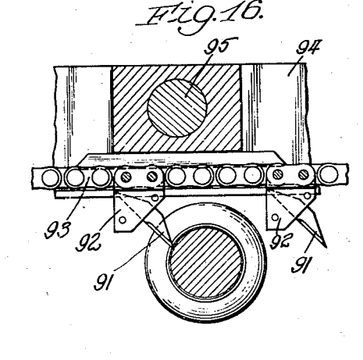
Fig 16 is an enlarged side elevation of the knives taken along line 16—16 of Fig. 15.
Figure 23:
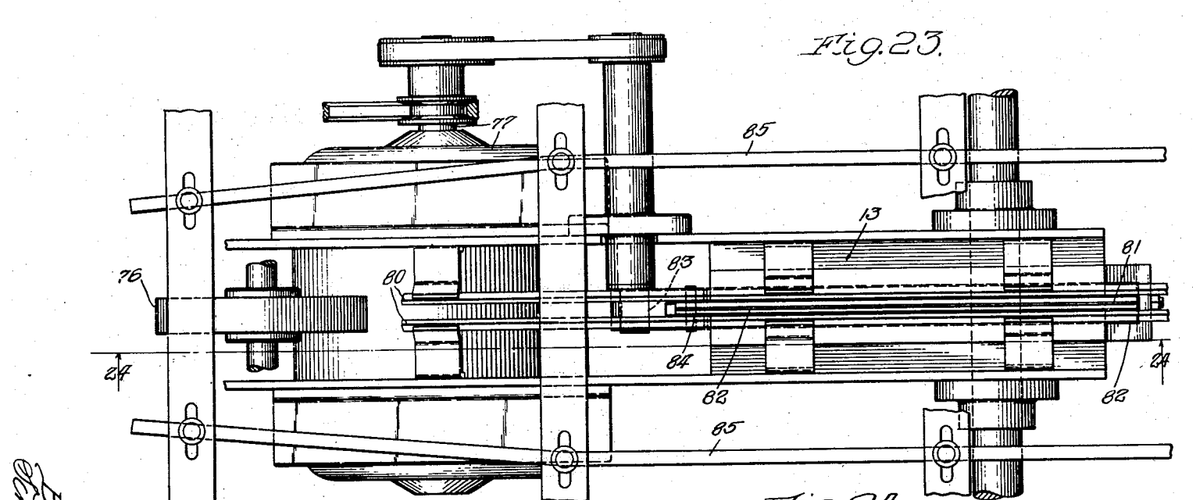
Fig. 23 is an enlarged plan view of the egg scoring mechanism.
Figure 24:
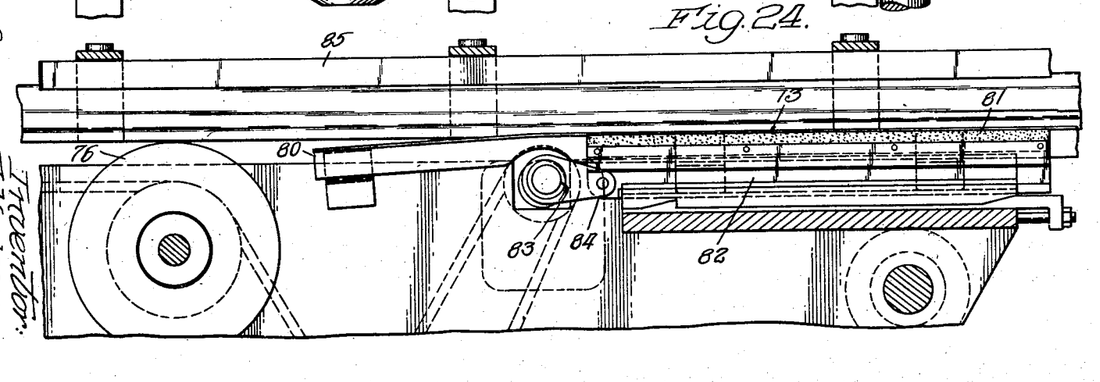
Fig. 24 is a sectional view taken on line 24—24 of Fig. 23.

While being cut, the egg is still in contact with the guides 80 and is, therefor, rotating in a clockwise direction, as viewed in Fig. 16. The egg membrane, therefore, as shown in Fig. 16, rises against the downwardly directed point of the knife.

Immediately after passing through the cutting zone, the vacuum cups 30 are drawn apart by a cam 101 which separates the egg shells and permits the contents thereof to fall into individual egg cups 102. The guides 80 of course terminate somewhat before the shells are opened so that there is no tendency for the eggs to be rotated after they have been separated. The separated egg shells are carried between the depending air housing 105 provided with a plurality of air jet openings 106 directed horizontally outwardly. The housing is provided with washed compressed air from any suitable source, and this air serves to wash out the remnants of egg white which otherwise might remain within the shells.

The egg cups 102 comprise a yolk retaining section 107 and a pivotally mounted separating section 108. The entire cup is mounted on an arm 109 having a slot 110 which engages the arm 111 carried by the chain 112. This chain is suitably guided within a housing 113.

Beneath the egg cup is a larger cup 114 removably mounted within the spring bracket 115. This bracket is carried by the counter-weighted wheel 116 having a depending counter-weight 117. The wheel 116 is carried by the shaft 118 which in turn is secured to the chain 119. The latter is guided within the housing 122.

As will be observed, the cup 102 is adapted to be opened and closed by movement of the upper portion 108 and this is accomplished by entering a cam surface beneath the nose 120 of the arm 121. Upon raising of the portion 108, the egg white falls into the cups 114, and, upon removal of the cam surface, the cap portion 108 cuts off the flow of egg white. This operation is repeated several times in order to separate the yolk and white. The various positions of the portions of the cup 102 are indicated in Fig. 2.

This is preferably accomplished by the cam 130 and the cam pin 131 operating through a hollow shaft 132. It will be observed in Fig. 4 that the cam 130 widens as the egg cups progress, causing the portion 108 to rise, after which the cam narrows, causing the top to fall and separate the white. This operation is repeated.

Figures 3, 20:
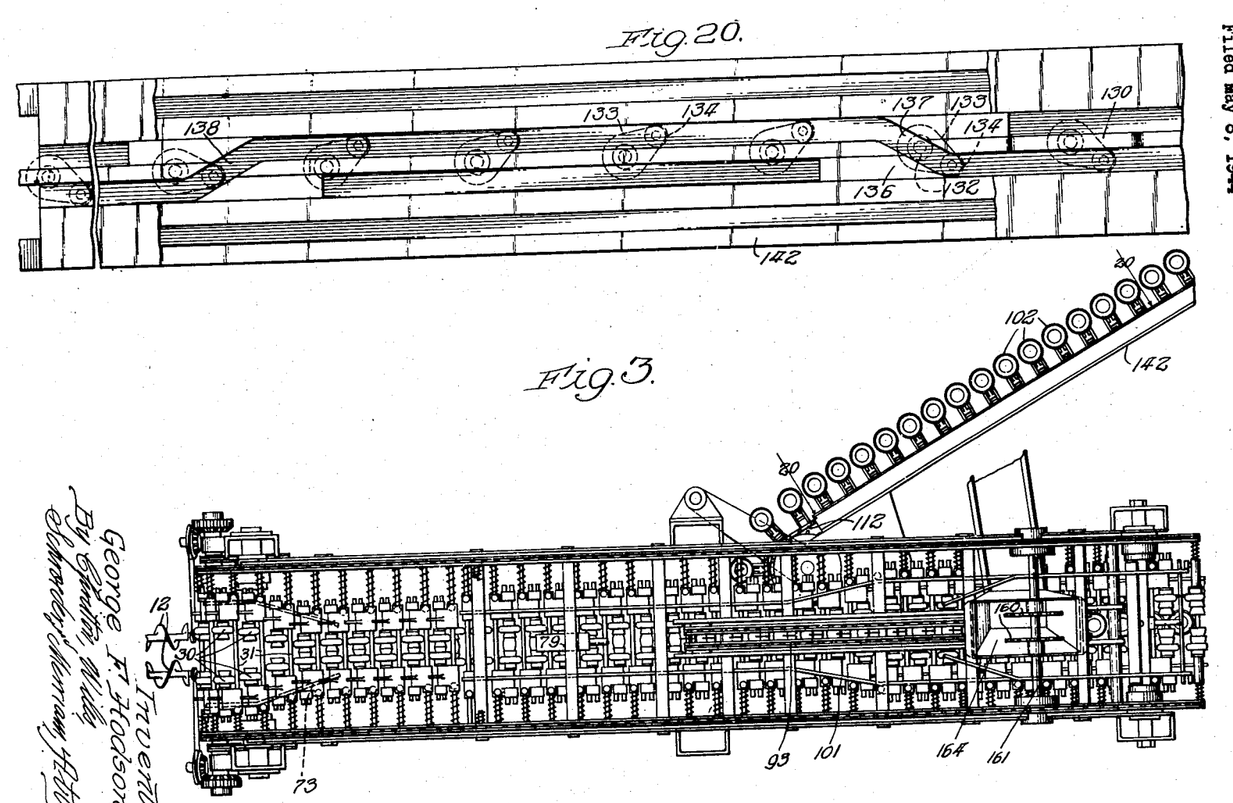
Figs. 3 and 4 represent plan views of the machine corresponding to Figs. 1 and 2, respectively.
Fig. 20 is a detailed sectional elevation taken along the line 20—20 in Fig. 3.
Figure 3:
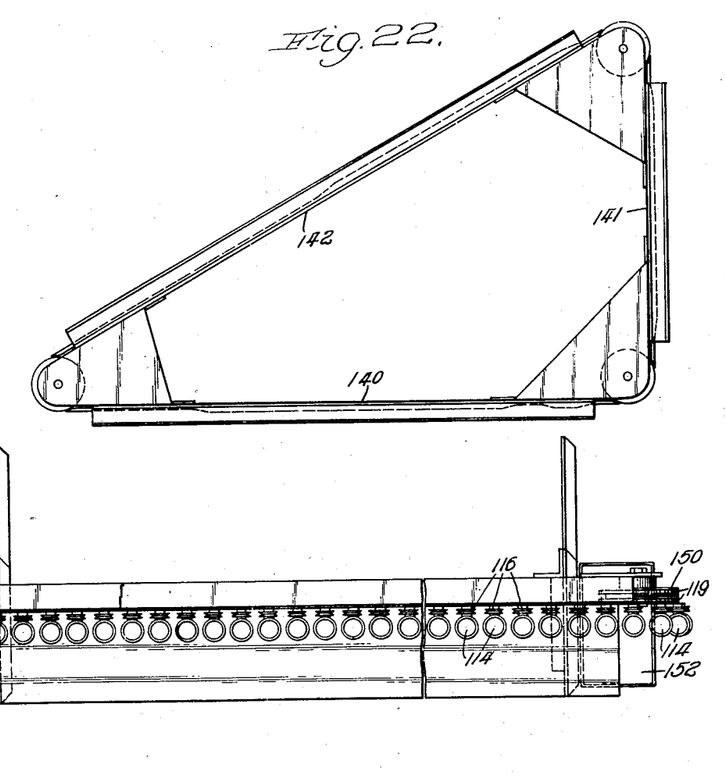

The cam 130 also serves as a cam surface for the roller 134 borne by the cam follower arm 133 which in turn is secured to the hollow shaft 132 carrying the egg cup. This cam surface is made use of to tilt the egg cups at the proper point, as shown in Fig. 20. The roller 134 is at this point riding on the cam surface 130 but is directed downwardly by the cam surface 136 through the opening 137 into the position shown by the dotted line in Fig. 19, and then is restored to upright position by the cam surface 138 which carries the roller back up upon the cam 130.

Figure 4:
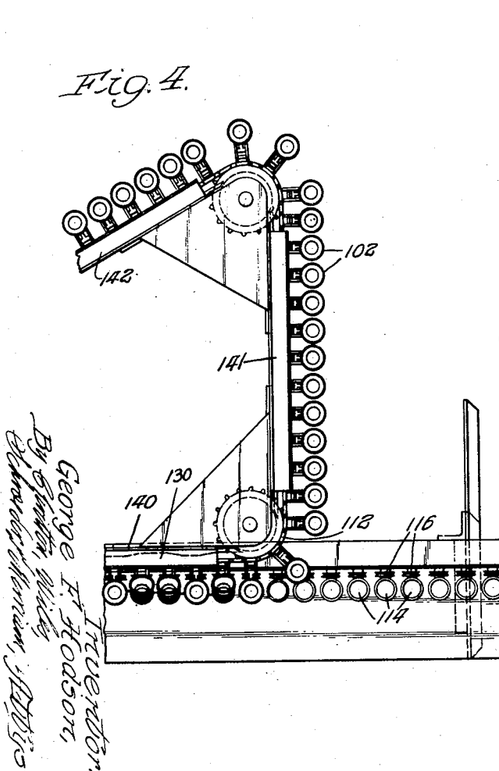

The path of the egg cups, as shown in Fig. 4, is triangular including the longitudinal leg 140, the transverse leg 141, and the diagonal leg 142. The tops of the egg cups are open throughout the leg 141 in order that the yolks may be inspected. In the event that any yolk is spoiled or otherwise unsuitable, the entire cup may be removed and washed by lifting it from the plate 111. The path of the egg receiving cups 114 is shown in Fig. 2. These cups are held in upright position by the counter-weights 117 and pass in longitudinal progression to the right of the drawing, then downwardly over the sprocket wheel 150 and over the cam 151. As shown in Fig. 21 the cam 151 contacts the wheel 116 and rotates it into an egg dumping position so that the egg white falls into the container 152. The last traces of egg white will not of course be completely removed, but this is not necessary so long as the egg material is not spoiled.

The egg shells are removed from the egg cups by the wheels 160 on the shaft 161. These wheels are driven synchronously with the movement of the cups 30 by sprocket wheels 162. The wheels 160 are provided circumferentially with teeth 163 which engage the egg shells carried by the cups 30 immediately adjacent the end of the rubber portion thereof. These teeth exert a pushing motion against the egg shells and serve to break the vacuum, thereby allowing the egg shells to fall into the hopper 164.

What I claim as new, and desire to secure by Letters Patent, is:

1. The method of automatically breaking eggs which comprises: advancing a series of eggs disposed in a predetermined spaced relationship and in a predetermined axial alignment, holding each egg by applying suction to its polar ends, carrying each egg while so held in said alignment into a grinding zone, grinding each egg shell circumferentially while rotating the egg without severing the egg membrane, exerting an axial tension on the egg shell by slight axial withdrawal of the severed halves of the shell, carrying the egg to a cutting zone, cutting the membrane of the egg, separating egg shells by axial movement of the severed halves and withdrawing the egg contents from the shells.

2. The method as set forth in claim 1 in which the membrane of the egg is cut while rotating the egg under tension.

3. The method as set forth in claim 1 in which the egg is held in axial alignment transverse to its direction of movement.

4. The method as set forth in claim 1 in which the suction is produced by forcing out air under grasping pressure and subsequently reducing the grasping pressure.

5. The method as set forth in claim 1 in which the egg is ground circumferentially while rotating it over a rapidly reciprocating grinding member.

6. The method as set forth in claim 1 in which the axial tension is limited by regulation of the suction.

7. The method as set forth in claim 1 in which the membrane of the egg is cut on an upper surface of the egg while rotating the egg.

8. The method as set forth in claim 1 in which the contents of each egg is collected in an individual container which is advanced synchronously with the egg during separation of the shells thereof.

9. In the automatic breaking of eggs, the steps which comprise: grinding each egg shell around the equatorial portion of the egg to cut substantially completely through the shell without cutting the membrane and then cutting an elongated slit in the membrane of the egg exposed by such grinding and withdrawing the contents from the shells.

10. In the automatic breaking of eggs the steps which comprise grinding each egg shell circumferentially while rotating the egg without severing the egg membrane and then circumferentially slitting the membrane of the egg exposed by such grinding and withdrawing the egg contents from the shell.

GEORGE F. HODSON.

REFERENCES CITED

The following references are of record in the file of this patent:

UNITED STATES PATENTS

| Number | Name | Date |
| --- | --- | --- |
| 1,361,121 | Weiss | Dec. 7, 1920 |
| 1,496,312 | Harkin | June 3, 1924 |
| 1,505,484 | Mulvany et al. | Aug. 19, 1924 |
| 1,635,843 | Hofmann | July 12, 1927 |
| 1,916,596 | Winfree | July 4, 1933 |
| 1,945,788 | Pilley | Feb. 6, 1934 |
| 1,988,030 | Young et al. | Jan. 15, 1935 |
| 2,090,963 | Reese | Aug. 24, 1937 |
| 2,018,044 | Weiss | Oct. 22, 1935 |
| 2,067,566 | Field | Jan. 12, 1937 |
| 2,173,278 | Kozelka et al. | Sept. 19, 1939 |
| 2,229,349 | Sigler | Jan. 21, 1941 |

FOREIGN PATENTS

| Number | Country | Date |
| --- | --- | --- |
| 1,799 | Australia (1931) | Feb. 18, 1932 |
| 747,130 | France | Mar. 21, 1933 |
| 214,873 | Switzerland | Aug. 16, 1941 |